US011978279B2

(12) United States Patent
Li et al.

(10) Patent No.: US 11,978,279 B2
(45) Date of Patent: May 7, 2024

(54) FINGERPRINT IDENTIFICATION CIRCUIT, DISPLAY PANEL AND CONTROL METHOD THEREOF

(71) Applicant: Hefei Visionox Technology Co., Ltd., Anhui (CN)

(72) Inventors: Dongsheng Li, Hefei (CN); Qingrong Ren, Hefei (CN); Feng Qi, Hefei (CN); Shuang Cui, Hefei (CN); Shiwen Hu, Hefei (CN); Rubo Xing, Hefei (CN)

(73) Assignee: Hefei Visionox Technology Co., Ltd., Hefei (CN)

( * ) Notice: Subject to any disclaimer, the term of this patent is extended or adjusted under 35 U.S.C. 154(b) by 0 days.

(21) Appl. No.: 18/360,202

(22) Filed: Jul. 27, 2023

(65) Prior Publication Data

US 2024/0021011 A1 Jan. 18, 2024

Related U.S. Application Data

(63) Continuation of application No. PCT/CN2022/086908, filed on Apr. 14, 2022.

(30) Foreign Application Priority Data

Aug. 12, 2021 (CN) .......................... 202110924831.8

(51) Int. Cl.
*G06V 40/13* (2022.01)
(52) U.S. Cl.
CPC ................... *G06V 40/1318* (2022.01)
(58) Field of Classification Search
CPC ... G06V 40/1318; G06F 18/00; G06F 3/0304; G06F 21/32; H03K 17/962
See application file for complete search history.

(56) References Cited

U.S. PATENT DOCUMENTS

2011/0190641 A1* 8/2011 Tateishi ............... A61B 5/0261
600/479
2014/0168038 A1 6/2014 Kim
(Continued)

FOREIGN PATENT DOCUMENTS

CN 104850292 A 8/2015
CN 104977599 A 10/2015
(Continued)

OTHER PUBLICATIONS

CN111027384—Machine Translation (Year: 2020).*
(Continued)

*Primary Examiner* — Antonio Xavier
(74) *Attorney, Agent, or Firm* — Maier & Maier, PLLC (57) ABSTRACT

A fingerprint identification circuit, a display panel, and a control method thereof. A first electrical signal is generated by a light sensation circuit in that fingerprint identification circuit according to the detected optical signal reflected by the finger, potential information of the first electrical signal is stored in a holding circuit, and a second electrical signal for fingerprint identification is output by a scanning circuit according to the potential information of the first electrical signal stored in the holding circuit, so that the fingerprint identification device can complete the collection of the electrical signals output by all the fingerprint identification circuits set by the fingerprint identification device in the case that the residence time of the user's finger is short, thereby supporting the design of fingerprint identification circuits with larger area and higher density in the optical fingerprint identification device.

17 Claims, 6 Drawing Sheets

(56) References Cited

U.S. PATENT DOCUMENTS

| | | | | |
|---|---|---|---|---|
| 2014/0184172 | A1* | 7/2014 | Momo | B60L 53/12 |
| | | | | 320/160 |
| 2019/0252456 | A1* | 8/2019 | Li | H01L 31/022408 |
| 2020/0134285 | A1 | 4/2020 | Hung et al. | |
| 2021/0232795 | A1* | 7/2021 | Zhang | G06V 40/1306 |

FOREIGN PATENT DOCUMENTS

| | | |
|---|---|---|
| CN | 107180611 A | 9/2017 |
| CN | 108133194 A | 6/2018 |
| CN | 105869554 B | 1/2019 |
| CN | 110532987 A | 12/2019 |
| CN | 111027384 A | 4/2020 |
| CN | 111179834 A | 5/2020 |
| CN | 111967423 A | 11/2020 |
| CN | 108321161 B | 1/2021 |
| CN | 112714268 A | 4/2021 |
| CN | 112906496 A | 6/2021 |
| CN | 113610022 A | 11/2021 |

OTHER PUBLICATIONS

International Search Report issued on Jun. 23, 2022, in corresponding International Patent Application No. PCT/CN2022/086908, 7 pages.

Office Action issued on Oct. 18, 2023, in corresponding Chinese Application No. 202110924831.8, 15 pages.

* cited by examiner

FINGERPRINT IDENTIFICATION CIRCUIT, DISPLAY PANEL AND CONTROL METHOD THEREOF

CROSS-REFERENCE TO RELATED APPLICATION

The present application is a continuation of International Application No. PCT/CN2022/086908, filed on Apr. 14, 2022, which claims priority of the Chinese Patent Application No. 202110924831.8, field to China National Intellectual Property Administration on Aug. 12, 2021, entitled "FINGERPRINT IDENTIFICATION CIRCUIT, DISPLAY PANEL AND CONTROL METHOD THEREOF", both of which are hereby incorporated by reference in their entireties.

TECHNICAL FIELD

The present application relate to the technical field of electronics, and in particular, to a fingerprint identification circuit, a display panel and a control method thereof.

BACKGROUND

With the continuous development of electronic technology, display screens set on mobile phones, tablet computers and other electronic equipment are getting larger and larger. In order to improve the display effect of the display screens of electronic equipment, some electronic equipment set display screens on whole display sides without setting other physical buttons. At this time, the electronic equipment needs to identify a user's finger fingerprint, and then realize fingerprint unlocking, fingerprint authentication and other functions.

In the related art, an optical fingerprint identification device for fingerprint identification may include a plurality of fingerprint identification circuits distributed in an array. When a user's finger is attached to a display screen above the optical fingerprint identification device, light emitted from the display screen is reflected by the finger to the optical fingerprint identification device below the display screen. Each fingerprint identification circuit in the optical fingerprint identification device may be used to receive reflected lights from the finger located in its upper area, through a set photosensitive device, and the photosensitive device converts a light signal into an electrical signal and outputs it, so that a processing unit in the subsequent electronic equipment may perform fingerprint identification according to the received electrical signal.

Due to the optical fingerprint identification device usually needs to set a large number of fingerprint identification circuits to improve the accuracy of fingerprint identification, and the user's finger stays on the display screen for a short time, how to make the optical fingerprint identification device be able to collect the electrical signals output by all fingerprint identification circuits set in the optical fingerprint identification device in the case that the residence time of the user's finger is short, which is an urgent technical problem to be solved in the art.

SUMMARY

The present application provides a fingerprint identification circuit, a display panel and a control method thereof, so that a fingerprint identification device can complete the collection of electrical signals output by all fingerprint identification circuits set in the fingerprint identification device in the case that the residence time of the user's finger is short.

A first aspect of the present application provides a fingerprint identification circuit, including: a light sensation circuit, a holding circuit, a scanning circuit and a reset circuit, where the light sensation circuit is connected with the scanning circuit and the reset circuit via the holding circuit; the light sensation circuit is arranged to generate a first electrical signal according to a detected light signal; the holding circuit is arranged to store potential information of the first electrical signal; the scanning circuit amplifies the first electrical signal stored in the holding circuit and outputs a second electrical signal, where the second electrical signal is arranged to indicate fingerprint information at a corresponding position of the fingerprint recognition circuit; and the reset circuit is arranged to delete an electrical signal stored in the holding circuit before the holding circuit stores the first electrical signal.

A second aspect of the present application provides a display panel, including: an optical fingerprint identification device; where the optical fingerprint identification device includes a plurality of fingerprint identification circuits as described above, and the plurality of fingerprint identification circuits are in a row-column distribution;

The optical fingerprint identification device is arranged in an array film layer of the display panel; or the optical fingerprint recognition device is arranged between an array film layer of the display panel and a substrate; or the optical fingerprint identification device is arranged on a side of a substrate away from an array film layer; or the optical fingerprint identification device is arranged on a side of an array film layer away from a substrate.

A third aspect of the present application provides a control method for electronic equipment, which may be applied to control a display panel provided in the second aspect of the present application, and the method includes: sending a first potential signal and a second potential signal to a light sensation circuit of at least one target fingerprint identification circuit among a plurality of fingerprint identification circuits of an optical fingerprint identification device; sending a first potential signal and a second potential signal to the light sensation circuit of the at least one target fingerprint identification circuit; sending a reset signal to a reset circuit of the at least one target fingerprint identification circuit; sending a holding signal to a holding circuit of the at least one target fingerprint identification circuit; sending scanning signals to each row of scanning circuits of the at least one target fingerprint identification circuit in turn, and sending data signals to each column of scanning circuits in this row of scanning circuits in turn, to obtain second electrical signals output by each row and column of target fingerprint identification circuits.

To sum up, in the fingerprint identification circuit, the display panel and the control method thereof provided by the embodiment of the application, after the detected light signal reflected by the finger is converted to the first electrical signal by the light sensation circuit, potential information of the first electrical signal is stored in the holding circuit, and the second electrical signal for fingerprint identification is output by the scanning circuit according to the first electrical signal stored in the holding circuit. The following technical effects can be achieved: 1. After the detected light signal is generated as the first electrical signal by the light sensation circuit, a bigger second electrical signal can be output by the scanning circuit according to the first electrical signal, thus improving the intensity and signal-to-noise ratio of the output signal of the fingerprint identification circuit and improving the accuracy of subsequent fingerprint identification according to the second electrical signal. 2. The potential information of the first electrical signal generated by the light sensation circuit according to the light signal in a short time can be stored by the holding circuit, so that even if there are a large number of fingerprint identification circuits in the optical fingerprint identification device, when the processing unit collects the second electrical signals, the scanning circuit can output the second electrical signal according to the first electrical signal stored in the holding circuit, thereby supporting the design of fingerprint identification circuits with larger area and higher density in the optical fingerprint identification device.

BRIEF DESCRIPTION OF DRAWINGS

In order to more clearly explain the embodiments of the present application or the technical solution in the prior art, the drawings needed to be used in the description of the embodiments or the prior art will be briefly introduced below. Obviously, the drawings in the following description are only some embodiments of the present application. For ordinary skill in the art, other drawings may be obtained according to these drawings without paying creative labor.

DETAILED DESCRIPTION OF EMBODIMENTS

In the following, technical solutions in embodiments of the present application will be clearly and completely described in combination with the drawings in embodiments of the present application. Obviously, the described embodiments are only a part of the embodiments of the present application, rather than all of the embodiments. Based on the embodiments in the present application, all other embodiments obtained by ordinary skill in the art without paying creative effort shall fall within the protection scope of the present application.

The technical solutions of the present application will be described in detail with specific embodiments. The following specific embodiments may be combined with each other, and the same or similar concepts or processes may not be repeated in some embodiments.

Figure 1:
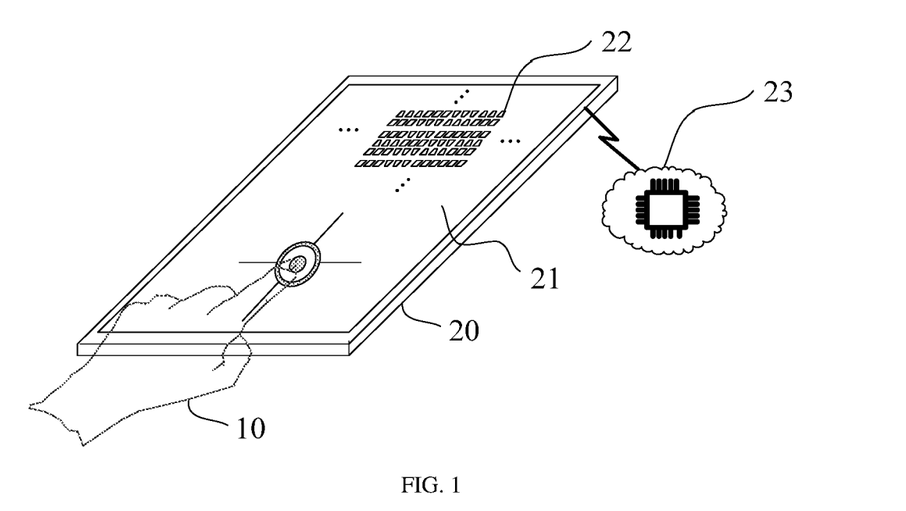
FIG. 1 is a schematic diagram of an application scenario of a fingerprint identification circuit provided by the present application.

FIG. 1 is a schematic diagram of an application scenario of a fingerprint identification circuit provided by the present application. The fingerprint identification circuit in the embodiment of the present application may also be called a fingerprint pixel circuit. In a scenario shown in FIG. 1, with the continuous development of electronic technology, a display screen 21 set on electronic equipment 20 such as mobile phones and tablet computers is getting larger and larger. In order to improve the display effect of the display screen of the electronic equipment 20, some electronic equipment sets the display screen 21 on the whole of their display side without setting other physical buttons. At this time, the electronic equipment 20 needs to identify a fingerprint of a user 10, so as to realize fingerprint unlocking, fingerprint authentication and other functions. One way is that an optical fingerprint recognition device 22 is hidden below the display screen 21 of the electronic equipment 20. When a finger of the user 10 is attached to a designated area of the display screen, a light emitted by the display screen 21 shines on the finger, and uneven parts on a fingerprint have different intensities of light reflection. Therefore, after the light reflected by the finger is collected by the optical fingerprint recognition device 22, the fingerprint may be further recognized by a processing unit 23 in the electronic equipment 20 according to collected light information.

Figure 2:
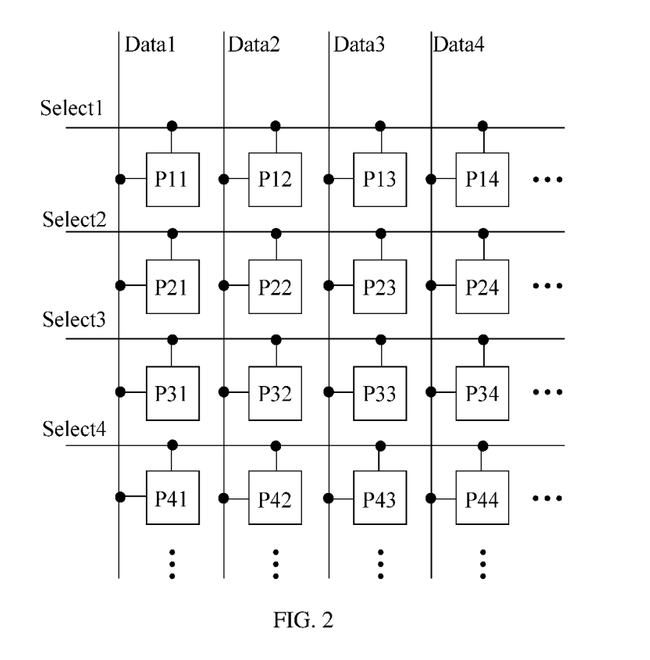
FIG. 2 is a schematic structural diagram of an optical fingerprint identification device provided by the present application.

In some embodiments, FIG. 2 is a schematic structural diagram of an optical fingerprint identification device provided by the present application, showing a schematic structural diagram of the optical fingerprint identification device 22 for collecting the light reflected by the finger of the user 10 in the scenario shown in FIG. 1, where the optical fingerprint identification device 22 includes a plurality of fingerprint identification circuits distributed in an array, in the example shown in FIG. 2, a plurality of fingerprint identification circuits are distributed in n rows and n columns, the fingerprint identification circuits are labeled P11, P12 . . . P21, P22 in turn according to the row and column where each fingerprint identification circuit is located. When the optical fingerprint identification device 22 is arranged below the display screen 21 and the finger of the user 10 is attached to the display screen, a light emitted from the display screen 21 is reflected by the finger to the optical fingerprint identification device 22 below the display screen 21. At this time, each fingerprint identification circuit in the optical fingerprint identification device 22 may be used to detect a light signal reflected by the finger of the user above, and convert the light signal into an electrical signal and output it.

In some embodiments, the display screen 21 specifically includes a display panel, and the display panel includes an optical fingerprint recognition device. The optical fingerprint identification device 22 includes a plurality of fingerprint identification circuits which are distributed in an array. In some embodiments, the optical fingerprint recognition device 22 may be disposed in the array film layer of the display panel, or between the array film layer of the display panel and a substrate, or on the side of the substrate away from the array film layer, or on the side of the array film layer away from the substrate.

Specifically, the optical fingerprint recognition device 22 shown in FIG. 2 may receive and detect the reflected light above in a row scanning way. The processing unit 23 in the electronic equipment 20 may send a scanning signal to the fingerprint identification circuit row by row. For example, the processing unit 23 may first send a scanning signal Select1 to a first row of fingerprint identification circuits P11, P12, P13 . . . . Subsequently, the processing unit 23 can sequentially send a data signal Data1 to a fingerprint recognition circuit P11 in the first row and the first column, and receive an electrical signal returned by the fingerprint recognition circuit P11, and send a data signal Data2 to a fingerprint recognition circuit P12 in the first row and the second column, and receive an electrical signal returned by the fingerprint recognition circuit P12 . . . and so on. So that the processing unit 23 sends a scanning signal to the next row of fingerprint identification circuits after obtaining electrical signals of all the fingerprint identification circuits in one row, and continues to obtain the electrical signals of all the fingerprint identification circuits in the next row. Finally, after obtaining electrical signals of all the fingerprint identification circuits, the processing unit 23 may perform fingerprint identification processing according to the electrical signals provided by all the fingerprint identification circuits. It should be noted that FIG. 2 only shows one possible connection relationship of each fingerprint identification circuit in receiving scanning signal and data signal, and a connection relationship of receiving other signals is not shown in the figure.

Figure 3:
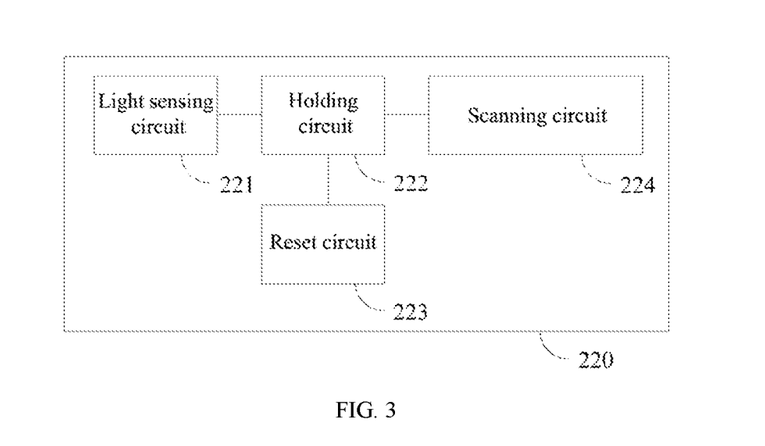
FIG. 3 is a schematic structural diagram of an embodiment of a fingerprint identification circuit provided by the present application.

FIG. 3 is a schematic structural diagram of an embodiment of a fingerprint identification circuit provided by the present application. A fingerprint identification circuit 220 shown in FIG. 3 may be any one of the optical fingerprint identification devices 22 shown in FIG. 2. As shown in FIG. 3, the fingerprint identification circuit 220 provided by the embodiment of the present application includes a light sensation circuit 221, a holding circuit 222, a scanning circuit 224 and a reset circuit 223. The light sensation circuit 221, the holding circuit 222 and the scanning circuit 224 are connected in turn, and the reset circuit 223 is connected to the holding circuit 222.

Specifically, the light sensation circuit 221 is used to convert a detected light signal into a first electrical signal, which may be a voltage at a first voltage dividing node. The light sensation circuit 221 may detect a light signal reflected by a finger above the fingerprint identification circuit 220 and convert the light signal into the first electrical signal, so as to adjust a first electrical signal value of the first voltage dividing node according to the detected light signals with different intensities.

The holding circuit 222 is used to store potential information of the first electrical signal, and the stored potential information of the first electrical signal may be used for the subsequent scanning circuit 224 to output a second electrical signal, which may be specifically the output voltage and current. When an electronic equipment 20 performs fingerprint recognition as a whole, the fingerprint recognition circuit 220 in the optical fingerprint recognition device 22 needs to detect the light reflected by the finger of a user 10 immediately after the light is emitted from a display screen 21, and at the same time, when the number of the fingerprint recognition circuits 220 is large, only with the use of row scanning, can a processing unit 23 acquire the second electrical signal output by each fingerprint recognition circuit 220 one by one. Assuming that the processing unit 23 may acquire second electrical signals output by n fingerprint identification circuits 220 every second, when the number of the fingerprint identification circuits 220 is greater than n and the user's finger stays for less than 1 second, the processing unit 23 may not be able to acquire all the second electrical signals output by the fingerprint identification circuits 220 before the finger is moved away. Therefore, the fingerprint identification circuit 220 may first store the potential information of the first electrical signal through the holding circuit 222 after the light signal reflected by the finger is detected by the light sensation circuit 221 and converted into the first electrical signal, so that even if the user 10 has removed subsequently the finger from the display screen 21, when the processing unit 23 sends a scanning signal to the fingerprint identification circuit 220, the fingerprint identification circuit 220 may still transmit the first electrical signal generated by the light sensation circuit 221 to the scanning circuit 224 through the holding circuit 222 and output the second electrical signal, thus ensuring that the processing unit 23 may acquire all the second electrical signals output by the fingerprint identification circuit 220 without prolonging the residence time of the user's finger. Therefore, in this embodiment, due to the addition of the holding circuit 222, when the number of the fingerprint identification circuits 220 in the optical fingerprint identification device 22 is large, the processing unit 23 may still collect the second electrical signal output by each fingerprint identification circuit 220, thereby supporting the design of fingerprint identification circuits 220 with higher density in a specific area in the optical fingerprint identification device 22.

The reset circuit 223 is used to delete the potential information stored in the holding circuit 222 before the holding circuit 222 stores the potential information of the first electrical signal of the first voltage dividing node, so as to prevent previously stored potential information from interfering with the potential information of the first electrical signal of the first voltage dividing node.

The scanning circuit 224 is used to output the second electrical signal according to the potential information of the first electrical signal stored in the holding circuit 222, where the second electrical signal output by the scanning circuit 224 is an electrical signal after amplifying the first electrical signal. The voltage and/or current of the second electrical signal is greater than the voltage and/or current of the first electrical signal of the first voltage dividing node. The second electrical signal output by the scanning circuit 224 is used to indicate the fingerprint information of the corresponding position of the fingerprint identification circuit 220. The scanning circuit 224 may output the second electrical signal to the processing unit 23 in the electronic equipment 20. After the processing unit 23 receives the second electrical signals output by all the fingerprint identification circuits 220, the fingerprint information of the corresponding position may be determined according to the second electrical signals provided by all fingerprint identification circuits 220, and subsequent fingerprint identification processing may be carried out. The present application does not limit the subsequent processing of the second electrical signal by the processing unit 23.

Figure 4:
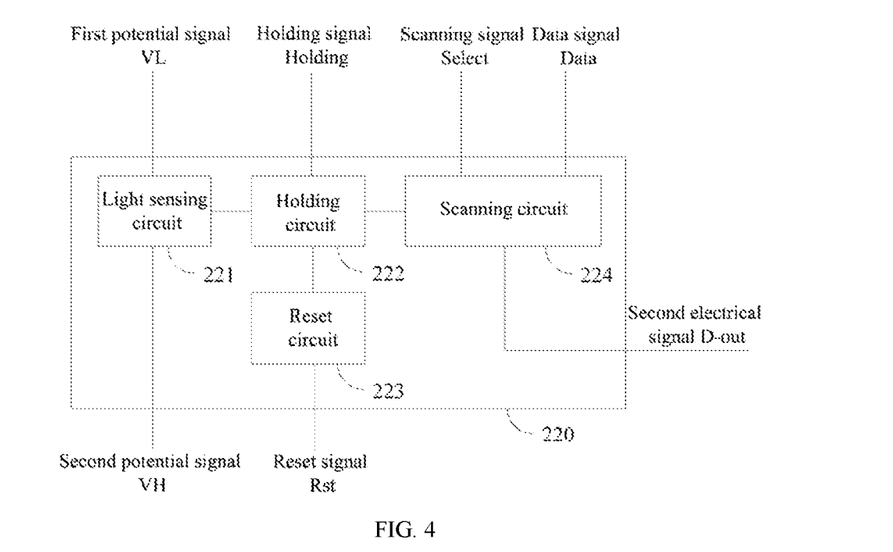
FIG. 4 is a schematic diagram of a signal interaction flow of the fingerprint identification circuit provided by the present application.

In some embodiments, FIG. 4 is a schematic diagram of a signal interaction flow of the fingerprint identification circuit provided by the present application. Each circuit in the fingerprint identification circuit 220 shown in FIG. 4 may be used to receive an external signal and execute a corresponding flow step according to the external signal.

The external signal may be sent by the processing unit 23 in the electronic equipment 20, or other processing elements in the electronic equipment 20. Specifically, in the fingerprint identification circuit 220 shown in FIG. 4, the light sensation circuit 221 may receive a first potential signal VL and a second potential signal VH, and generate the first electrical signal according to the detected light signal under the action of the first potential signal VL and the second potential signal VH. The first potential signal VL and the second potential signal VH correspond to different voltage values, for example, the first potential signal VL can be a low-level signal, the second potential signal VH can be a high-level signal, and the specific voltage values of the first potential signal VL and the second potential signal VH are not limited in this embodiment. The holding circuit 222 may be used to receive the holding signal Holding and store the potential information of the first electrical signal at the first voltage dividing node according to the holding signal Holding. The reset circuit 223 may be used to receive the reset signal Rst and delete the potential information of the first electrical signal stored in the holding circuit 222 according to the reset signal Rst. The scanning circuit 224 may be used to receive the scanning signal Select and the data signal Data, and after the scanning signal Select is received, the second electrical signal D-out is output according to the data signal Data and the potential information of the first electrical signal at the first voltage dividing node.

Figure 5:
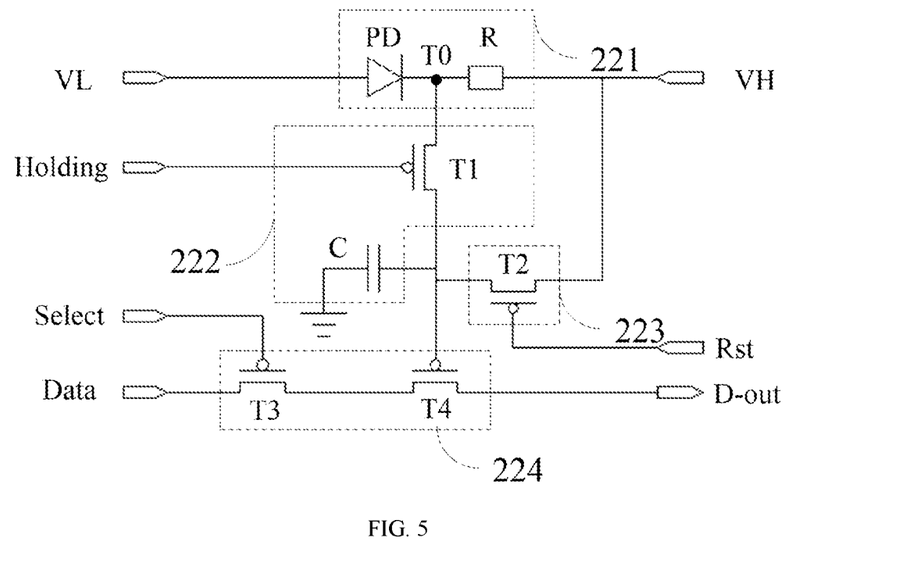
FIG. 5 is a schematic circuit structure diagram of an embodiment of a fingerprint identification circuit provided by the present application.

FIG. 5 is a schematic circuit structure diagram of an embodiment of a fingerprint identification circuit provided by the present application. As shown in FIG. a possible circuit implementation of the fingerprint identification circuit provided by FIG. 4 is shown, and the circuit implementation and principle of each part of the fingerprint identification circuit are described below.

The light sensation circuit 221 includes a photosensitive sensor PD and a resistor R. a first end of the photosensitive sensor PD is used for receiving a first potential signal VL, a second end of the photosensitive sensor PD is connected with a first end of the resistor R through a first voltage dividing node TO, and a second end of the resistor R is used for receiving a second potential signal VH. In some embodiments, the photosensitive sensor PD may be a photosensitive resistor. When the photosensitive sensor PD does not receive a light, the resistance is high and it is in a reverse bias state. At this time, if the first end of the photosensitive sensor PD receives the first potential signal VL and the second end of the resistor R receives the second potential signal VH, the voltage of the first voltage dividing node TO between the second end of the photosensitive sensor PD and the first end of the resistor R is about −3V, for example. However, when the photosensitive sensor PD detects the light signal to reduce its resistance, at this time, if the first end of the photosensitive sensor PD receives the first potential signal VL and the second end of the resistor R receives the second potential signal VH, the first potential signal VL and the second potential signal VH are in a series circuit formed by the photosensitive sensor PD and the resistor R, and the voltage at the first voltage dividing node TO changes, for example, from −3V to about −6V, and the changed electrical signal of the first voltage dividing node TO may be sent to the holding circuit 222 as the first electrical signal.

The holding circuit 222 includes a capacitor C and a first switch tube T1, a control end of the first switch tube T1 is used to receive the holding signal Holding, and a first end of the first switch tube T1 is used to connect the first voltage dividing node TO, that is, the second end of the photosensitive sensor PD and the first end of the resistor R. A second end of the first switch tube T1 is connected to a first end of the capacitor C, and a second end of the capacitor C is grounded. When the control end of the first switch tube T1 in the holding circuit 222 does not receive the holding signal Holding, the first switch tube T1 is in an off state and does not receive the first electrical signal from the first voltage dividing node TO. When the control end of the first switch tube T1 in the holding circuit 222 receives the holding signal Holding, the first switch tube T1 is in an on state, so that the first end of the capacitor C is connected with the first end of the resistor R and the second end of the photosensitive sensor PD through the first switch tube T1. The capacitor C may receive the first electrical signal from the first voltage dividing node TO and store the potential information of the first electrical signal.

The reset circuit 223 includes a second switch tube T2. The control end of the second switch tube T2 is used for receiving the reset signal Rst, a first end of the second switch tube T2 is used for receiving the second potential signal VH, and a second end of the second switch tube T2 is connected with the first end of the capacitor C. When the control end of the second switch tube T2 in the reset circuit 223 does not receive the reset signal Rst, the second switch tube T2 is in the off state and does not reset the holding circuit 222. When the control end of the second switch tube T2 in the reset circuit 223 receives the reset signal Rst, the second switch tube T2 is in the on state, and the first end of the capacitor C may be connected with the second potential signal VH through the second switch tube T2. At this time, the second potential signal VH at both ends of the capacitor C and a grounding point jointly reset the potential information stored in the capacitor C, and the potential information stored in the capacitor C is cleared by discharging the charge in the capacitor C from the grounding point, so as to prevent the remaining charge in the capacitor C from affecting the storage of the potential information of the first electrical signal in the capacitor C.

The scanning circuit 224 includes a fourth switch tube T3 and a third switch tube T4. A control end of the fourth switch tube T3 is used for receiving the scanning signal Select, a control end of the third switch tube T4 is connected with the second end of the first switch tube T1, a first end of the fourth switch tube T3 is used for receiving a data signal, a second end of the fourth switch tube T3 is connected with a first end of the third switch tube T4, and a second end of the third switch tube T4 is used for outputting a second electrical signal D-out. When the control end of the fourth switch tube T3 in the scanning circuit 224 does not receive the scanning signal Select, the fourth switch tube T3 is in the off state, and the scanning circuit 224 does not output the second electrical signal (electrical signal D-out). When the control end of the fourth switch tube T3 in the scanning circuit 224 receives the scanning signal Select, the fourth switch tube T3 is in the on state, and the third switch tube T4 may receive the potential information of the first voltage dividing node TO stored in the holding circuit, so as to output the second electrical signal D-out according to the data signal Data of the first end and the first electrical signal of the control end, and the output second electrical signal may be specifically used for indicating the fingerprint information of the corresponding position of the fingerprint identification circuit.

In some embodiments, the third switch tube T4 provided by the present application may be a thin film transistor (Thin Film Transistor, TFT for short), for example, a P-type TFT, when the photosensitive sensor PD generates the first electrical signal according to the detected light signal, the obtained first electrical signal (voltage value and current value) at the first voltage dividing node T0 is small; for example, when a light is not detected by the photosensitive sensor PD, the voltage of the first voltage dividing node T0 is −3V, and after the photosensitive sensor PD detects the change of light resistance, the voltage of the first voltage dividing node T0 is −6V, and the voltage change of the first voltage dividing node T0 before and after is −3V, so that the absolute value of the voltage change range (−6V to −3V) output by the first voltage dividing node T0 in two different states whether light is detected or not is 3. Due to the change range is small, the subsequent fingerprint identification based on the voltage and/or current of the first voltage dividing node T0 will result in higher signal-to-noise ratio and higher probability of misjudgment. Therefore, in the embodiment of the present application, the voltage value at point T0 is taken as the gate input voltage of the TFT according to the IV characteristic of the P-type TFT of the third switch tube T4, so that when the gate voltage of the TFT changes slightly, the current of the second electrical signal D-out output by the second end of the TFT may also change greatly under the driving of the direct current of the data signal Data input at the first end of the TFT. That is, the third switch tube T4 provided in the scanning circuit 224 provided in the present application may amplify the smaller first electrical signal at the first voltage dividing node obtained by the light sensation circuit 221 to obtain a larger second electrical signal D-out and output it, that is, amplifying the voltage and/or current of the first electrical signal and outputting a second electrical signal with a larger voltage and/or current. Therefore, when the second electrical signal with greater voltage and/or current output by the scanning circuit 224 is used for fingerprint identification subsequently, the greater voltage and/or current of the second electrical signal D-out can more clearly indicate the reflection of light by fingerprints at different positions, thereby improving the accuracy of fingerprint identification.

Figure 6:
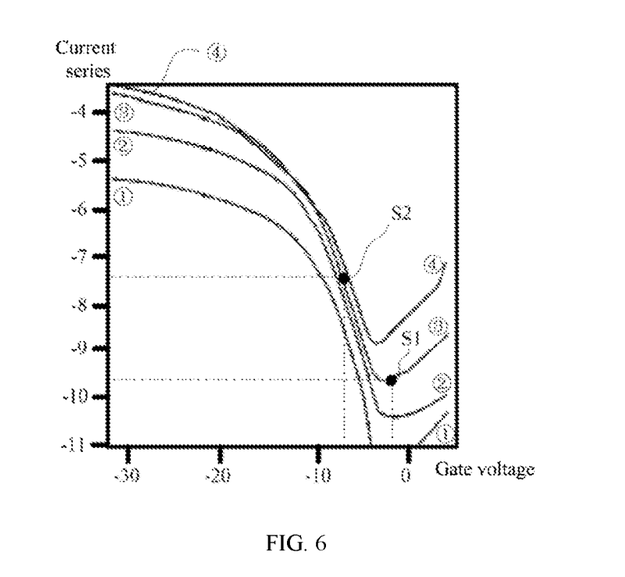
FIG. 6 is a schematic diagram of an IV curve of a third switch tube provided by present application.

In some embodiments, take the first electrical signal as a voltage signal and the second electrical signal as a current signal as an example, FIG. 6 is a schematic diagram of an IV curve of a third switch tube T4 provided by the present application, where the abscissa as shown in FIG. 6 is the gate voltage of the third switch tube T4, and the ordinate is the current series of the output electrical signal D-out, and each line represents that when the data signal Data has different voltages, the change of the current series of the second electrical signal D-out output by the scanning circuit 224 caused by the change of the gate voltage of the third switch tube T4, for example, the curve marked ① is used to indicate that when the third switch tube T4 receives the data signal Data with a voltage of 0.1, the current series of the output second electrical signal D-out changes between −11 and −4 when the voltage received by its gate changes around −30V-0V. Accordingly, the voltage of curve ② corresponding to data signal Data is −1V, the voltage of curve ③ corresponding to data signal Data is −5V, and the voltage of curve ④ corresponding to data signal Data is −10V.

Taking the voltage of the data signal Data received by the third switch tube T4 is −5V as an example, it can be seen from the curve marked ③ in FIG. 6 that the current of the second electrical signal D-out output by the third switch tube T4 is about $10^{-10}$ to $10^{-9}$ at S1 point on the curve when the photosensitive sensor PD does not detect a light, the voltage at the first voltage dividing node T0 is −3V and the voltage received by the third switch tube T4 is −3V. At S2 point on the curve, when the photosensitive sensor PD detects the change of light resistance, the voltage of the first voltage dividing node T0 changes from −3V to −6V, and the voltage of −6V at T0 point is input to the gate of the third switch tube T4 as the first electrical signal, at this time, the current of the second electrical signal D-out output by the third switch tube T4 is about $10^{-8}$ to $10^{-7}$ A. Therefore, the absolute value of the voltage change range (−6V to −3V) output by the first voltage dividing node T0 in two different states whether light is detected or not is 3V, which only corresponds to the change relationship of 2 times. It can be amplified by the third switch tube T4 later, and finally the second electrical signal D-out with a larger current change range (100 times) is output, so that the signal-to-noise ratio is smaller and the probability of misjudgment is lower when fingerprint identification is performed according to the output second electrical signal D-out. In some embodiments, the changed current of the second electrical signal D-out may correspond to a voltage change of 50 times, and it is also much larger than the voltage change range of the first voltage dividing node T0.

In some embodiments, the first switch tube T1, the second switch tube T2, the fourth switch tube T3 and the third switch tube T4 provided by the present application may all be TFT. Alternatively, the first switch tube T1, the second switch tube T2, the fourth switch tube T3 and the third switch tube T4 provided in the present application may be other types of switch tubes with on and off functions, and the specific implementation of the switch tubes is not limited in the present application.

To sum up, in the fingerprint identification circuit, the display panel and the control method thereof provided by the embodiment of the present application, after the first electrical signal is generated according to the detected light signal reflected by the finger by the light sensation circuit, the voltage information of the first electrical signal is stored in the holding circuit, and the second electrical signal for fingerprint identification is output by the scanning circuit according to the voltage information stored in the holding circuit. The following technical effects can be achieved: 1. The detected light signal is converted into the first electrical signal of the first voltage dividing node by the light sensation circuit, and the second electrical signal with greater voltage and/or current can be output by the scanning circuit according to the smaller voltage and/or current of the first voltage dividing node, thus improving the intensity and signal-to-noise ratio of the output signal of the fingerprint identification circuit and improving the accuracy of subsequent fingerprint identification according to the current output by the scanning circuit. 2. The potential information of the first electrical signal generated by the light sensation circuit according to the light signal in a short time can be stored by the holding circuit, so that even if there are a large number of fingerprint identification circuits in the optical fingerprint identification device, when the processing unit collects the second electrical signals output by all the fingerprint identification circuits, the scanning circuit can output the second electrical signal according to the potential information of the first electrical signal stored in the holding circuit, thereby supporting the design of fingerprint identification circuits with larger area and higher density in the optical fingerprint identification device.

Figure 7:
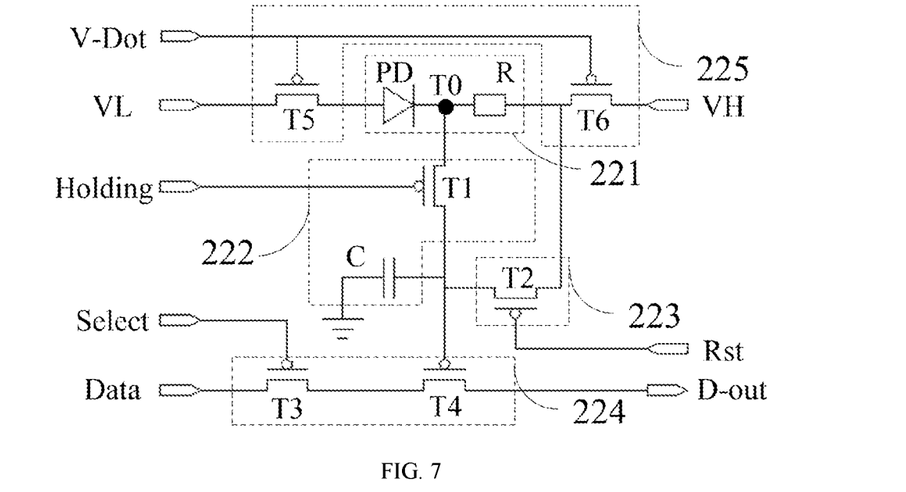
FIG. 7 is a schematic circuit structure diagram of another embodiment of a fingerprint identification circuit provided by the present application.

In some embodiments, FIG. 7 is a schematic circuit structure diagram of another embodiment of a fingerprint identification circuit provided by the present application. The fingerprint identification circuit shown in FIG. 7 further includes a switch circuit 225 on the basis of the embodiment shown in FIG. 5. The switch circuit 225 is used to control whether the light sensation circuit 221 can generate the first electrical signal of the first voltage dividing node according to the detected light signal by switching the on and off states. For example, when the switch circuit 225 is turned on, the light sensation circuit 221 can generate a first electrical signal according to the detected light signal, and the subsequent scanning circuit 224 can output a second electrical signal. If the switch circuit 225 is turned off, the light sensation circuit 221 cannot generate the first electrical signal according to the detected light signal, and the scanning circuit 224 cannot output the second electrical signal.

In some embodiments, the switch circuit 225 shown in FIG. 7 includes the fifth switch tube T5 and the sixth switch tube T6. The fifth switch tube T5 is arranged at the first end of the photosensitive sensor PD, and the sixth switch tube T6 is arranged at the second end of the resistor R, so that the first end of the photosensitive sensor PD receives the first potential signal VL through the fifth switch tube T5, and the second end of the resistor R receives the second potential signal VH through the sixth switch tube T6. The fifth switch tube T5 and the sixth switch tube T6 may be turned on or turned off at the same time under the control of the control signal. In some embodiments, the control signal V-Dot for controlling the conduction of the fifth switch tube T5 and the sixth switch tube T6 in the switch circuit 225 may be sent by the processing unit 23, or by other control elements in the electronic equipment 20, applications in software systems, and the like.

When the fifth switch tube T5 and the sixth switch tube T6 are turned on at the same time, the switch circuit 225 is turned on. When the fifth switch tube T5 and the sixth switch tube T6 are turned off at the same time, the switch circuit 225 is turned off. For example, when the fifth switch tube T5 and the sixth switch tube T6 are turned on by receiving the control signal, the first end of the photosensitive sensor PD may receive the first potential signal VL through the fifth switch tube T5, and the second end of the resistor R may receive the second potential signal VH through the sixth switch tube T6. The light sensation circuit 221 may generate the first electrical signal according to the detected light signal, so that the scanning circuit 224 of the subsequent fingerprint identification circuit may subsequently output the second electrical signal after receiving the scanning signal, thus making the whole fingerprint identification circuit in operating condition. However, when the fifth switch tube T5 and the sixth switch tube T6 do not receive the control signal and are turned off, the photosensitive sensor PD and the resistor R cannot receive the first potential signal and the second potential signal, and the light sensation circuit 221 may not generate the first electrical signal, so that the fingerprint identification circuit does not output voltage, and the whole fingerprint identification circuit is not in operating state.

Therefore, in the embodiment shown in FIG. 7, by adding the switch circuit to the fingerprint identification circuit, the whole fingerprint identification circuit may be controlled by the control signal, and the fingerprint identification circuit can be enabled differently in the fingerprint identification process. When the fingerprint identification circuit needs to output the second electrical signal, the switch circuit can be turned on to output the second electrical signal, and when it is not needed, the switch circuit is turned off to prevent the fingerprint identification circuit from outputting the second electrical signal, so as to save invalid signal processing process and invalid power consumption in the fingerprint identification circuit, and to improve the overall signal amount needed for fingerprint identification and reduce power consumption by using the optical fingerprint identification device.

Figure 8:
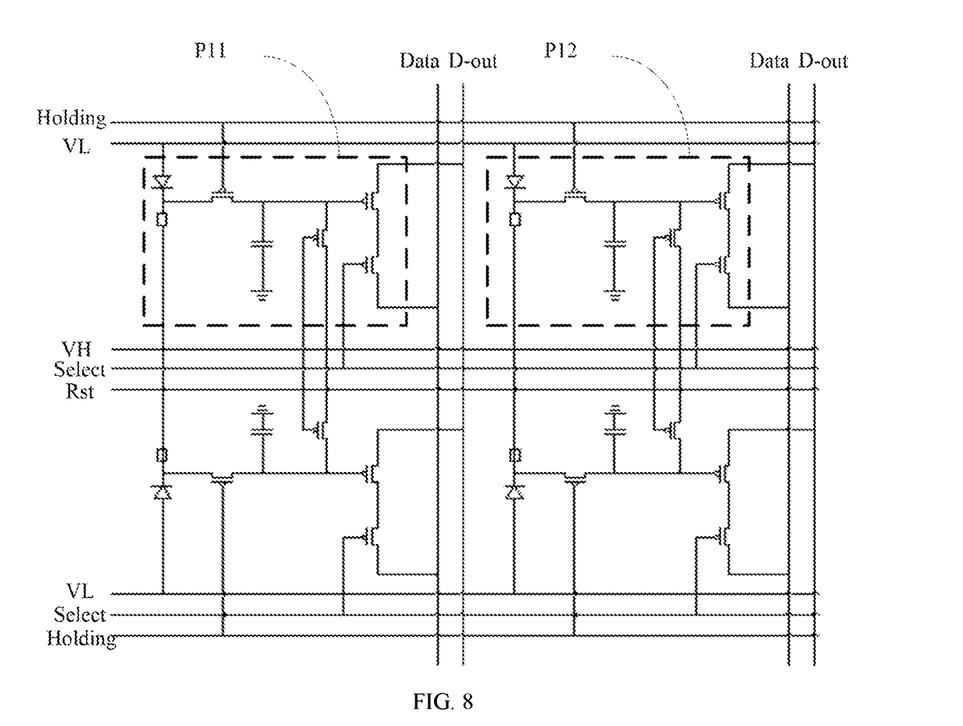
FIG. 8 is a schematic structural diagram of an embodiment of an optical fingerprint identification device provided by the present application.

In some embodiments, FIG. 8 is a schematic structural diagram of an embodiment of an optical fingerprint identification device provided by the present application. The optical fingerprint identification device shown in FIG. 8 includes a plurality of fingerprint identification circuits, and each fingerprint identification circuit is implemented by using the circuit structure shown in FIG. 5 or FIG. 7, and is arranged as P11, P12 in row and column form.

Figure 9:
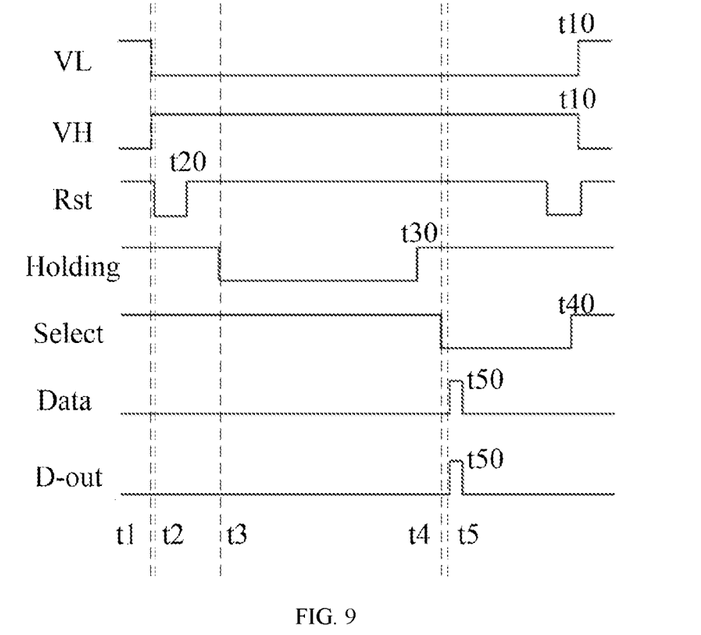
FIG. 9 is a sequence diagram of an embodiment of a control method for electronic equipment provided by the present application.

The application also provides a control method of electronic equipment, which may be applied to the electronic equipment 20 shown in FIG. 1. When the optical fingerprint identification device 22 adopts the structure shown in FIG. 8 and each fingerprint identification circuit 220 adopts the structure shown in FIG. 5 or FIG. 7, the processing unit 23 controls a plurality of fingerprint identification circuits 220 in the optical fingerprint identification device 22 included in the display panel of the electronic equipment 20. For example, FIG. 9 is a sequence diagram of an embodiment of a control method for electronic equipment provided by the present application. Referring to FIG. 9, the control method of electronic equipment provided by the present application includes:

S100: sending a control signal to a switch circuit of at least one target fingerprint identification circuit among a plurality of fingerprint identification circuits of an optical fingerprint identification device. The number of target fingerprint identification circuits is less than the number of all fingerprint identification circuits in the optical fingerprint identification device. The processing unit may send the control signal before the time t1 shown in FIG. 8 and continue until the time t1 of the next cycle.

S101: sending a first potential signal and a second potential signal to a light sensation circuit in at least one target fingerprint identification circuit. The processing unit may send the first potential signal and the second potential signal to the light sensation circuit of each fingerprint identification circuit at time t1 shown in FIG. 8, and continue until time t10 before the next scanning cycle of the fingerprint identification circuit. The light sensation circuit of each fingerprint identification circuit may generate a first electrical signal according to the detected light signal after receiving the first potential signal and the second potential signal. In some embodiments, the first potential signal VL is at a low level and the second potential signal VH is at a high level.

S102: sending a reset signal to a reset circuit in at least one target fingerprint identification circuit. The processing unit may send a reset signal to the reset circuit of each fingerprint identification circuit at time t2 after time t1 shown in FIG. 9, and continue until time t20 before time t3, and then each reset circuit deletes the potential information stored before time t2 after receiving the reset signal. In some embodiments, when the second switching tube T2 in the reset circuit is a P-type TFT, the reset signal Rst shown in FIG. 9 is a low-level signal.

S103: sending a holding signal to a holding circuit in at least one target fingerprint identification circuit. The processing unit may send a holding signal to the holding circuit of each fingerprint identification circuit at t3 after t2 shown in FIG. 9, and continue until t30 before t4, so each holding circuit may receive and store the potential information of the first electrical signal in the first voltage dividing node after receiving the holding signal. In some embodiments, when the first switch tube T1 in the holding circuit is a P-type TFT, the holding signal Holding shown in FIG. 9 is a low-level signal.

S104: sending scanning signals to the scanning circuits in each row of target fingerprint identification circuits by a row scanning way in turn, for example, a row scanning signal Select is sent to a row of fingerprint identification circuits at time t4 shown in FIG. 9 and the row scanning signal Select continues until time t40. During the time period between time t4 and time t40, the processing unit also sends high-level data signals Data to the scanning circuits in each column of target fingerprint identification circuits in that row of the scanning circuits in each row of target fingerprint identification circuits in turn. When the fourth switch tube T3 in the scanning circuit is a P-type TFT, the scanning signal Select as shown in FIG. 9 is a low-level signal. Finally, the processing unit may receive the high-level second electrical signal D-out output by the fingerprint identification circuits in this row and column at the corresponding moment after each sending the high-level data signal Data between T4 and T40 shown in FIG. 9. The relationship between the current and voltage of the second electrical signal D-out may be referred to the schematic diagram shown in FIG. 6.

Figure 11:
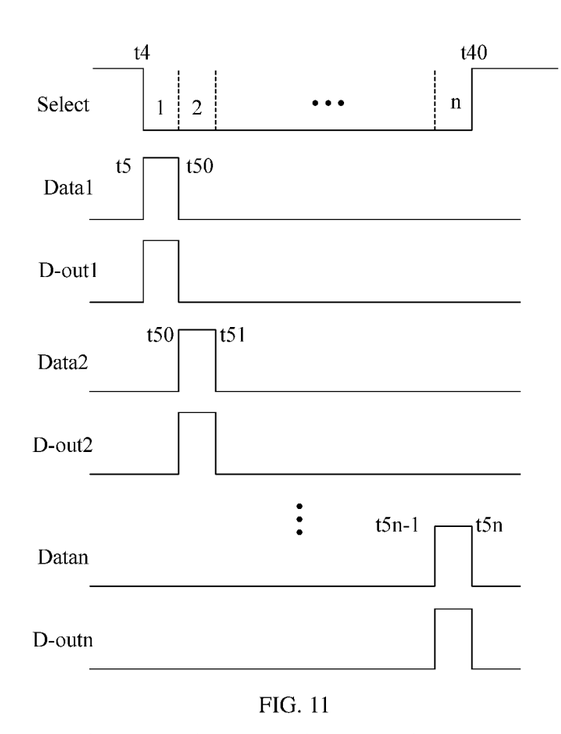
FIG. 11 is a sequence diagram of yet another embodiment of a control method for electronic equipment provided by the present application.

For example, FIG. 11 is a sequence diagram of yet another embodiment of a control method for electronic equipment provided by the present application. For the time t4-t40 during which the scanning signal Select sent to the scanning circuits in a row of target fingerprint identification circuits lasts, assuming that there are n scanning circuits in the row, the data signal Data1 is sent to the scanning circuit in the first fingerprint identification circuit in the row at time t5 and lasts until time t50, and the D-out1 output by the first fingerprint identification circuit is received at the same time; at t50, the data signal Data2 is sent to the scanning circuit of the second fingerprint identification circuit in the row for the same time until t51, and the D-out2 output by the second fingerprint identification circuit is received at the same time, and so on, until at t5n-1, the data signal Datan is sent to the scanning circuit of the n-th fingerprint identification circuit in the row for the same time until t40, and the D-outn output by the n-th fingerprint identification circuit is received at the same time. Then, the above process as shown in FIG. 11 in S104 is repeated, and the scanning signal Select is sent to the scanning circuit in the next row of target fingerprint identification circuits, and the high-level data signal Data is sequentially sent to the scanning circuit in each column of target fingerprint identification circuits in the next row of target fingerprint identification circuits within the duration of the scanning signal Select in turn. Until the second electrical signals D-out output by all the rows of the target fingerprint identification circuits are received.

Figure 10:
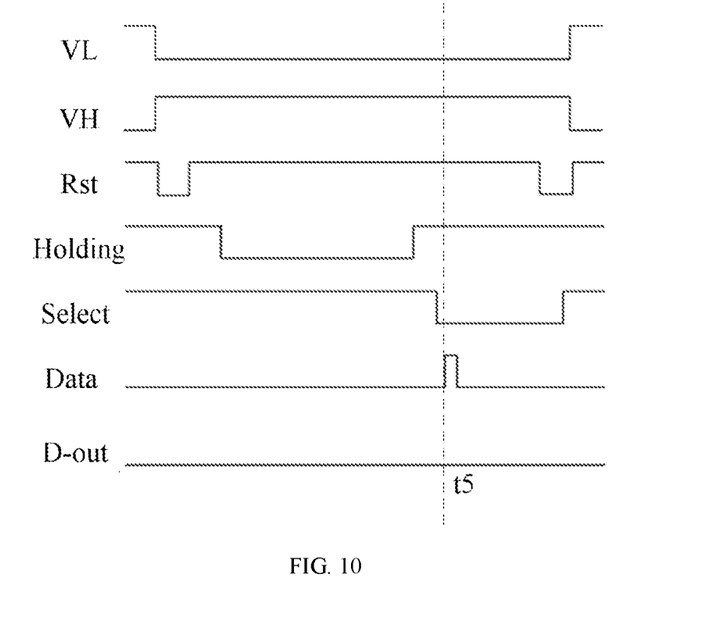
FIG. 10 is a sequence diagram of another embodiment of a control method for electronic equipment provided by the present application.

It should be noted that, as shown in FIG. 9, a sequence diagram of an embodiment of a control method for electronic equipment is shown. Because there are different concave and convex areas on the finger, the light reflected by the convex areas is strong, and the fingerprint recognition circuit corresponding to the convex areas on the finger can output the high-level second electrical signal D-out as shown in FIG. 9 after time t5. However, under the condition that the light reflected by the concave area of the finger is weak, so that the light sensation circuit does not output the first electrical signal, the scanning circuit will not output the second electrical signal D-out even if it receives the scanning signal, and its waveform diagram is shown in FIG. 10, FIG. 10 is a sequence diagram of another embodiment of a control method for electronic equipment provided by the present application, and it can be seen that the output end of the fingerprint identification circuit is at a low level after t5, and no high-level second electrical signal D-out is output.

Finally, after the processing unit obtains the second electrical signals output by all the plurality of fingerprint identification circuits in the optical fingerprint identification device, the fingerprint image of the finger above all the plurality of fingerprint identification circuits may be determined according to the voltage and/or current of the second electrical signals, and then subsequent fingerprint identification processing can be carried out. For example, when it is determined that the fingerprint identification circuit outputs the second electrical signal D-out as shown in FIG. 9, it is determined that a protruding part of the fingerprint is above the fingerprint identification circuit is, and when it is determined that the fingerprint identification circuit outputs the second electrical signal D-out as shown in FIG. 10, it is determined that a depressed part of the fingerprint is above the fingerprint identification circuit. When the control method for electronic equipment in the embodiment of the present application is implemented, the operating way and principle of each fingerprint identification circuit may refer to the introduction of the fingerprint identification circuit mentioned above, and will not be repeated here.

Figure 12:
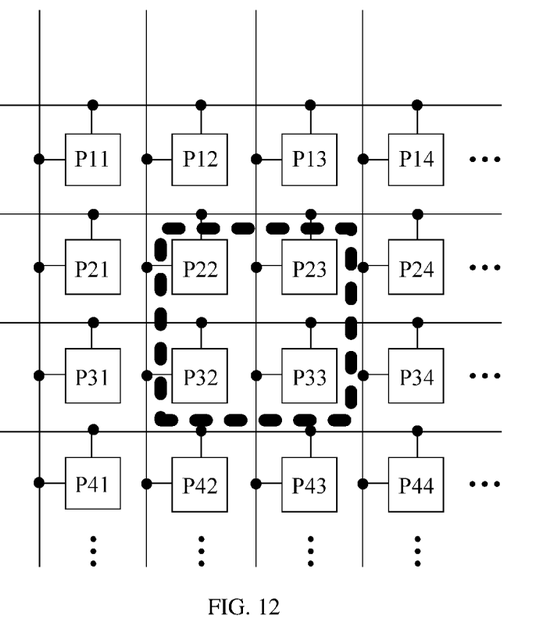
FIG. 12 is a schematic diagram of an application scenario of an optical fingerprint identification device provided by the present application.

FIG. 12 is a schematic diagram of an application scenario of an optical fingerprint identification device provided by the present application. When the optical fingerprint identification device as shown in FIG. 12 includes a plurality of fingerprint identification circuits as shown in FIG. 7, if only part of fingerprint identification circuits P22, P23, P32 and P33 are needed at this time, the processing unit 23 may send control signals to the switch circuits of these fingerprint identification circuits, so that the fifth switch tubes T5 and the sixth switch tubes T6 in the switch circuits of the four fingerprint identification circuits P22, P23, P32 and P33 are turned on, and the second electrical signal can be output normally, and then the fingerprint identification can be performed only according to the second electrical signals output by the four fingerprint identification circuits. However, the switch circuits of other fingerprint identification circuits do not receive the control signal, and the fifth switch tubes T5 and the sixth switch tubes T6 not be turned on, so they do not output the second electrical signal. Therefore, in the application scenario of this embodiment, the selective control of different fingerprint identification circuits may be realized by the control signal, and the fingerprint identification circuit in the area to be identified is turned on and controlled to output the second electrical signal, while the fingerprint identification circuit in the area need not to be identified does not output the second electrical signal, thus saving the invalid signal processing process and the invalid power consumption, improving the overall signal amount required for fingerprint identification using the optical fingerprint identification device and reducing the power consumption, and at the same time, being beneficial to the differential identification setting of electronic equipment using the optical fingerprint identification device.

It can be understood by those skilled in the art that all or part of the steps for implementing the above method embodiments may be completed by hardware related to program instructions. The aforementioned program may be stored in a computer-readable storage medium. When the program is executed, the steps including the above method embodiments are executed. The aforementioned storage media includes ROM, RAM, magnetic disk or optical disk and other media that may store program codes.

Finally, it should be noted that the above embodiments are only used to illustrate the technical solution of the present application, but not to limit it; although the present application has been described in detail with reference to the foregoing embodiments, those of ordinary skill in the art should understand that it is still possible to modify the technical solutions described in the foregoing embodiments or to equivalently replace some or all of the technical features therein; these modifications or replacements do not make the essence of the corresponding technical solution deviate from the scope of the technical solutions of the embodiments of the present application.

What is claimed is:

1. A fingerprint identification circuit, comprising:
a light sensation circuit, a holding circuit, a scanning circuit, and a reset circuit, wherein the light sensation circuit is connected with the scanning circuit and the reset circuit via the holding circuit;
the light sensation circuit is arranged to generate a first electrical signal according to a detected light signal;
the holding circuit is arranged to store potential information of the first electrical signal;
the scanning circuit is arranged to amplify the first electrical signal stored in the holding circuit and output a second electrical signal, wherein the second electrical signal is arranged to indicate fingerprint information at a corresponding position of the fingerprint recognition circuit; and
the reset circuit is arranged to delete an electrical signal stored in the holding circuit before the holding circuit stores the first electrical signal;
wherein the light sensation circuit comprises:
a photosensitive sensor and a resistor, wherein a first end of the photosensitive sensor is arranged to receive a first potential signal, a second end of the photosensitive sensor is connected with a first end of the resistor through a first voltage dividing node, and a second end of the resistor is arranged to receive a second potential signal; and
the light sensation circuit is configured to take an electrical signal of the second end of the photosensitive sensor or an electrical signal of the first end of the resistor as the first electrical signal when the first end of the photosensitive sensor receives the first potential signal, the second end of the resistor receives the second potential signal, and a resistance value of the photosensitive sensor changes according to the detected light signal.

2. The fingerprint identification circuit according to claim 1, wherein the holding circuit comprises:
a capacitor and a first switch tube, wherein a control end of the first switch tube is arranged to receive a holding signal, a first end of the first switch tube is arranged to connect the second end of the photosensitive sensor and the first end of the resistor, a second end of the first switch tube is connected to a first end of the capacitor, and a second end of the capacitor is grounded; and the holding circuit is configured to store the potential information of the first electrical signal into the capacitor when receiving the holding signal.

3. The fingerprint identification circuit according to claim 2, wherein the reset circuit comprises:
a second switch tube, wherein a control end of the second switch tube is configured to receive a reset signal, a first end of the second switch tube is configured to receive the second potential signal, and a second end of the second switch tube is connected with the first end of the capacitor; and
the reset circuit is configured to control the first end of the capacitor to be connected to the second potential signal after receiving the reset signal.

4. The fingerprint identification circuit according to claim 3, wherein the scanning circuit comprises:
a third switch tube, wherein a control end of the third switch tube is configured to receive the first electrical signal stored in the holding circuit, a first end of the third switch tube is configured to receive a data signal, and a second end of the third switch tube is configured to output the second electrical signal; and
the third switch tube is configured to receive the data signal and output the second electrical signal under the control of the first electrical signal stored in the holding circuit.

5. The fingerprint identification circuit according to claim 4, wherein the scanning circuit further comprises:
a fourth switch tube, wherein a control end of the fourth switch tube is configured to receive a scanning signal, a first end of the fourth switch tube is configured to receive a data signal, and a second end of the fourth switch tube is connected with the first end of the third switch tube; and
the fourth switch tube is configured to receive the data signal and output the data signal to the first end of the third switch tube after receiving the scanning signal and turning on the fourth switch tube.

6. The fingerprint identification circuit according to claim 1, wherein the fingerprint identification circuit further comprises a switch circuit;
the switch circuit comprises a fifth switch tube and a sixth switch tube, wherein a control end of the fifth switch tube and a control end of the sixth switch tube are configured to receive a control signal; and
when the fifth switch tube and the sixth switch tube are turned on according to the control signal, the first end of the photosensitive sensor receives the first potential signal via the fifth switch tube, and the second end of the resistor receives the second potential signal via the sixth switch tube.

7. The fingerprint identification circuit according to claim 6, wherein
the switch tube comprises a thin film transistor (TFT).

8. A display panel, comprising:
an optical fingerprint identification device, wherein the optical fingerprint identification device comprises a plurality of fingerprint identification circuits according to claim 1, and the plurality of fingerprint identification circuits are in a row-column distribution; and
the optical fingerprint identification device is arranged in an array film layer of the display panel; or the optical fingerprint recognition device is arranged between an array film layer of the display panel and a substrate; or the optical fingerprint identification device is arranged on a side of a substrate away from an array film layer; or the optical fingerprint identification device is arranged on a side of an array film layer away from a substrate.

9. The display panel according to claim 8, wherein the light sensation circuit comprises:
a photosensitive sensor and a resistor, wherein a first end of the photosensitive sensor is configured to receive a first potential signal, a second end of the photosensitive sensor is connected with a first end of the resistor, and a second end of the resistor is configured to receive a second potential signal; and
the light sensation circuit is arranged to take an electrical signal of the second end of the photosensitive sensor or an electrical signal of the first end of the resistor as the first electrical signal when the first end of the photosensitive sensor receives the first potential signal, the second end of the resistor receives the second potential signal, and a resistance value of the photosensitive sensor changes according to the detected light signal.

10. The display panel according to claim 9, wherein the holding circuit comprises:
- a capacitor and a first switch tube, wherein a control end of the first switch tube is configured to receive a holding signal, a first end of the first switch tube is configured to connect the second end of the photosensitive sensor and the first end of the resistor, a second end of the first switch tube is connected to a first end of the capacitor, and a second end of the capacitor is grounded; and
- the holding circuit is configured to store potential information of the first electrical signal into the capacitor when receiving the holding signal.

11. The display panel according to claim 10, wherein the reset circuit comprises:
- a second switch tube; wherein a control end of the second switch tube is configured to receive a reset signal, a first end of the second switch tube is configured to receive the second potential signal, and a second end of the second switch tube is connected with the first end of the capacitor; and
- the reset circuit is configured to control the first end of the capacitor to be connected to the second potential signal after receiving the reset signal.

12. The display panel according to claim 11, wherein the scanning circuit comprises:
- a third switch tube, wherein a control end of the third switch tube is configured to receive the first electrical signal stored in the holding circuit, a first end of the third switch tube is configured to receive a data signal, and a second end of the third switch tube is configured to output the second electrical signal; and
- the third switch tube is configured to receive the data signal and output the second electrical signal under the control of the first electrical signal stored in the holding circuit.

13. The display panel according to claim 12, wherein the scanning circuit further comprises:
- a fourth switch tube, wherein a control end of the fourth switch tube is configured to receive a scanning signal, a first end of the fourth switch tube is configured to receive a data signal, and a second end of the fourth switch tube is connected with the first end of the third switch tube; and
- the fourth switch tube is configured to receive the data signal and output the data signal to the first end of the third switch tube after receiving the scanning signal and turning on the fourth switch tube.

14. The display panel according to claim 9, wherein the fingerprint identification circuit further comprises a switch circuit;
- the switch circuit comprises a fifth switch tube and a sixth switch tube, wherein a control end of the fifth switch tube and a control end of the sixth switch tube are configured to receive a control signal; and
- when the fifth switch tube and the sixth switch tube are turned on according to the control signal, the first end of the photosensitive sensor receives the first potential signal via the fifth switch tube, and the second end of the resistor receives the second potential signal via the sixth switch tube.

15. The display panel according to claim 14, wherein the switch tube comprises a thin film transistor (TFT).

16. A control method of a display panel, which is applicable to control the display panel provided in claim 8, the method comprising:
- sending a first potential signal and a second potential signal to a light sensation circuit of at least one target fingerprint identification circuit among a plurality of fingerprint identification circuits;
- sending a reset signal to a reset circuit of the at least one target fingerprint identification circuit;
- sending a holding signal to a holding circuit of the at least one target fingerprint identification circuit; and
- sending a scanning signal to each row of scanning circuits of the at least one target fingerprint identification circuit and sending a data signal to each column of scanning circuits in this row of scanning circuits, to obtain a second electrical signal output by each row and column of target fingerprint identification circuits.

17. The method according to claim 16, further comprising:
- sending a control signal to a switch circuit of the at least one target fingerprint identification circuit, wherein a number of the target fingerprint identification circuit is smaller than a number of fingerprint identification circuits in the optical fingerprint identification device.

* * * * *